(12) United States Patent
Godlove et al.

(10) Patent No.: US 11,728,976 B1
(45) Date of Patent: Aug. 15, 2023

(54) SYSTEMS AND METHODS FOR EFFICIENTLY SERVING BLOCKCHAIN REQUESTS USING AN OPTIMIZED CACHE

(71) Applicant: Alchemy Insights, Inc., San Francisco, CA (US)

(72) Inventors: Benjamin Godlove, Arlington, VA (US); John Forbes Hayden, III, New York, NY (US); Steven Yang, Milpitas, CA (US); Noam Hurwitz, San Francisco, CA (US)

(73) Assignee: Alchemy Insights, Inc., San Francisco, CA (US)

( * ) Notice: Subject to any disclaimer, the term of this patent is extended or adjusted under 35 U.S.C. 154(b) by 0 days.

(21) Appl. No.: 18/087,799

(22) Filed: Dec. 22, 2022

(51) Int. Cl.
*H04L 29/06* (2006.01)
*G06F 21/00* (2013.01)
*H04L 9/08* (2006.01)
*H04L 9/32* (2006.01)

(52) U.S. Cl.
CPC .......... *H04L 9/0825* (2013.01); *H04L 9/3242* (2013.01); *H04L 9/3297* (2013.01)

(58) Field of Classification Search
None
See application file for complete search history.

(56) References Cited

U.S. PATENT DOCUMENTS

| 5,371,878 | A  | 12/1994 | Coker |
| 8,086,732 | B1 | 12/2011 | Volz |
| 8,554,929 | B1 | 10/2013 | Szeto et al. |
| 9,613,120 | B1 | 4/2017 | Kharatishvili et al. |
| 2008/0098349 | A1 | 4/2008 | Lin et al. |
| 2010/0293335 | A1 | 11/2010 | Muthiah et al. |
| 2011/0078705 | A1 | 3/2011 | Maclinovsky |

(Continued)

FOREIGN PATENT DOCUMENTS

| CN | 109992993 A | * | 7/2019 |
| CN | 112150130 A |   | 12/2020 |

(Continued)

OTHER PUBLICATIONS

Koul, Rohan, "Blockchain Oriented Software Testing—Challenges and Approaches", IEEE, 2018 3rd International Conference for Convergence in Technology (I2CT), The Gateway Hotel, XION Complex, Wakad Road, Pune, India. Apr. 6-8, 2018, pp. 1-6.

(Continued)

*Primary Examiner* — Lisa C Lewis
(74) *Attorney, Agent, or Firm* — Carr & Ferrell LLP (57) ABSTRACT

Systems and methods for efficiently serving blockchain requests using an optimized cache are disclosed herein. An example method normalizing a request for blockchain data into a key, the request including a hash of a canonical head block of the blockchain data, searching a distributed key value store using the key, the distributed key value store comprising key value pairs, each of the key value pairs being associated with responsive blockchain data, determining when one of the key value pairs match the key, placing a pending job space for a job in the distributed key value store when one of the key value pairs is not found, and storing a new key value pair in the distributed key value store when a response for the request is obtained, the response being new responsive blockchain data.

30 Claims, 10 Drawing Sheets

(56) References Cited

U.S. PATENT DOCUMENTS

| | | |
|---|---|---|
| 2011/0161488 A1 | 6/2011 | Anderson |
| 2012/0310878 A1 | 12/2012 | Vuksan et al. |
| 2016/0283348 A1 | 9/2016 | Golde et al. |
| 2017/0091069 A1 | 3/2017 | Fujiwara et al. |
| 2018/0089041 A1 | 3/2018 | Smith et al. |
| 2018/0145836 A1 | 5/2018 | Saur et al. |
| 2018/0300227 A1 | 10/2018 | Bergen |
| 2019/0171451 A1 | 6/2019 | Hardy et al. |
| 2020/0097953 A1 | 3/2020 | Islam et al. |
| 2020/0233858 A1 | 7/2020 | Deng et al. |
| 2020/0286026 A1 | 9/2020 | Dahod et al. |
| 2020/0396065 A1 | 12/2020 | Gutierrez-Sheris |
| 2021/0067319 A1 | 3/2021 | Chung et al. |
| 2021/0097484 A1 | 4/2021 | Ramos et al. |
| 2021/0124730 A1 | 4/2021 | Kannan et al. |
| 2021/0201328 A1 | 7/2021 | Gunther |
| 2021/0240733 A1 | 8/2021 | Kramer et al. |
| 2021/0263719 A1 | 8/2021 | Pai et al. |
| 2021/0304205 A1 | 9/2021 | Saka et al. |
| 2021/0314154 A1 | 10/2021 | Husson et al. |
| 2022/0004539 A1 | 1/2022 | De Caro et al. |
| 2022/0027348 A1 | 1/2022 | Manevich et al. |
| 2022/0027970 A1 | 1/2022 | Kim et al. |
| 2022/0159069 A1 | 5/2022 | Shirley et al. |
| 2022/0173893 A1 | 6/2022 | Basu et al. |
| 2022/0335049 A1 | 10/2022 | Hacigumus et al. |
| 2023/0098185 A1 | 3/2023 | Carver et al. |

FOREIGN PATENT DOCUMENTS

| | | | | |
|---|---|---|---|---|
| KR | 1796690 B1 | * | 11/2017 | ............ G06F 21/572 |
| WO | WO-2020259352 A1 | * | 12/2020 | ............. H04L 63/12 |

OTHER PUBLICATIONS

Hertz, "How to Implement Caching Layers in Web3 Products", Sep. 22, 2022, productcoalition.com, https://productcoalltion.com/how-to-implement-caching-layers-in-web3-products-feca245bc5c6, 6 pages.

Wang et al., "Decentralized Caching for Content Delivery Based on blockchain: A Game Theoretic Perspective", Jan. 23, 2018, arxiv.org, https://arxiv.org/pdf/1801.07604.pdf, 6 pages.

Basu et al., "Adaptive TTL-Based Caching for Content Delivery", Dec. 9, 2017, arxiv.org, https://arxiv.org/pdf/1704.04448.pdf, 27 pages.

Cecchet, "Encyclopedia of Database Systems", 2009, Springer, 212 pages.

* cited by examiner

SYSTEMS AND METHODS FOR EFFICIENTLY SERVING BLOCKCHAIN REQUESTS USING AN OPTIMIZED CACHE

CROSS-REFERENCE TO RELATED APPLICATIONS

This application is related to U.S. Ser. No. 18/083,421, filed on Dec. 16, 2022 entitled "Systems and Methods for Creating a Consistent Blockchain Including Block Commitment Determinations," which is hereby incorporated by reference herein in its entirety, for all purposes. The present utility patent application is also related to U.S. Ser. No. 18/087,761, filed Dec. 22, 2022 entitled "System and Method for High Performance Providing Fresh NFT Metadata," U.S. Ser. No. 18/087,732, filed Dec. 22, 2022 entitled "Systems and Methods for Adaptively Rate Limiting Client Service Requests at a Blockchain Service Provider Platform," and U.S. Ser. No. 18/087,746, filed Dec. 22, 2022 entitled "System and Method for Intelligent Testing of Blockchain Applications Using a Shadow System." The contents of each of these above-mentioned applications are incorporated herein by reference for all purposes to the extent that such subject matter is not inconsistent herewith or limiting hereof.

TECHNICAL FIELD

This disclosure pertains to blockchain technology, and more particularly, but not by way of limitation, to systems and methods for efficiently serving blockchain requests using an optimized cache.

SUMMARY

According to some embodiments, the present disclosure is directed to a method comprising normalizing a request for blockchain data into a key, the request including a hash of a canonical head block of the blockchain data, searching a distributed key value store using the key, the distributed key value store comprising key value pairs, each of the key value pairs being associated with responsive blockchain data, determining when the key matches one of the key value pairs, placing a pending job space for a job in the distributed key value store when one of the key value pairs is not found, and generating and storing a new key value pair in the distributed key value store when a response for the request is obtained, the response being new responsive blockchain data, the new key value pair comprising the key.

According to some embodiments, the present disclosure is directed to a system comprising a processor and a memory for storing instructions, the instructions being executed by the processor to normalize a request for blockchain data into a key, the request including a hash of a canonical head block of the blockchain data; search a distributed key value store using the key, the distributed key value store comprising key value pairs, each of the key value pairs being associated with responsive blockchain data; determine when the key matches one of the key value pairs; place a pending job space for a job in the distributed key value store when a match is not found; and store a new key value pair in the distributed key value store when a response for the request is obtained, the new key value pair comprising the key.

BRIEF DESCRIPTION OF DRAWINGS

Exemplary embodiments are illustrated by way of example and not limitation in the figures of the accompanying drawings, in which like references indicate similar elements.

DETAILED DESCRIPTION OF EXAMPLE EMBODIMENTS

Overview

For context, the distributed or decentralized nature of blockchain networks may result in requests for blockchain data being served from many nodes in the network. This may result in inconsistencies, as these nodes operate independently from one another. Furthermore, nodes are hard to manage, scale, keep online, and serve data in a consistent manner.

When new data is placed onto the blockchain, many requests for this data may occur. For example, when a new NFT (non-fungible token) or other blockchain object is created, many applications or end points may want information about this object. Thus, the blockchain network may be bombarded with identical calls for the same data. If several or many of the nodes receive identical requests, the time and effort required to generate responses is not only expensive (both in compute and monetary resources), but is unnecessarily duplicative.

The systems and methods herein provide for normalization and deduplication of requests for blockchain data. This allows requesters to have their requests responded to in an efficient and fast manner. Moreover, the responses that are generated are consistent and reflect data obtained from the most current and consistent version of the blockchain that is available because answers are obtained from a consistent view of the blockchain. Rather than having to generate responses for every request, identical requests are served from the optimized cache.

In some embodiments, the systems and methods provide an optimized cache in the form of a distributed key value store that can be used to deduplicate requests for blockchain data. In some instances, requests are hashed and stored in the distributed key value store. These requests can be normalized and appended with helpful data, such as a hash of a canonical head of the blockchain, to ensure that the values are fresh and have not been obtained from a newer or different version of the blockchain than requested.

The present disclosure also provides ways to update the distributed key value store when a new request is received and no match exists in the distributed key value store. These requests are processed using a jobs methodology, which can include creating a pending job space in the distributed key value store. This pending job space can be filled with a value when a response to the request has been found in the blockchain. Various methods can be used to track and update a job, which can include allowing nodes to fill their own requests if a job is too old or no response has been generated after a certain number of attempts.

In some instances, the cache can be optimized using both parity testing and synchronization processes. In various embodiments, when a response cannot be generated, an error message can be returned as a response to a request.

Example Embodiments

Figure 1:
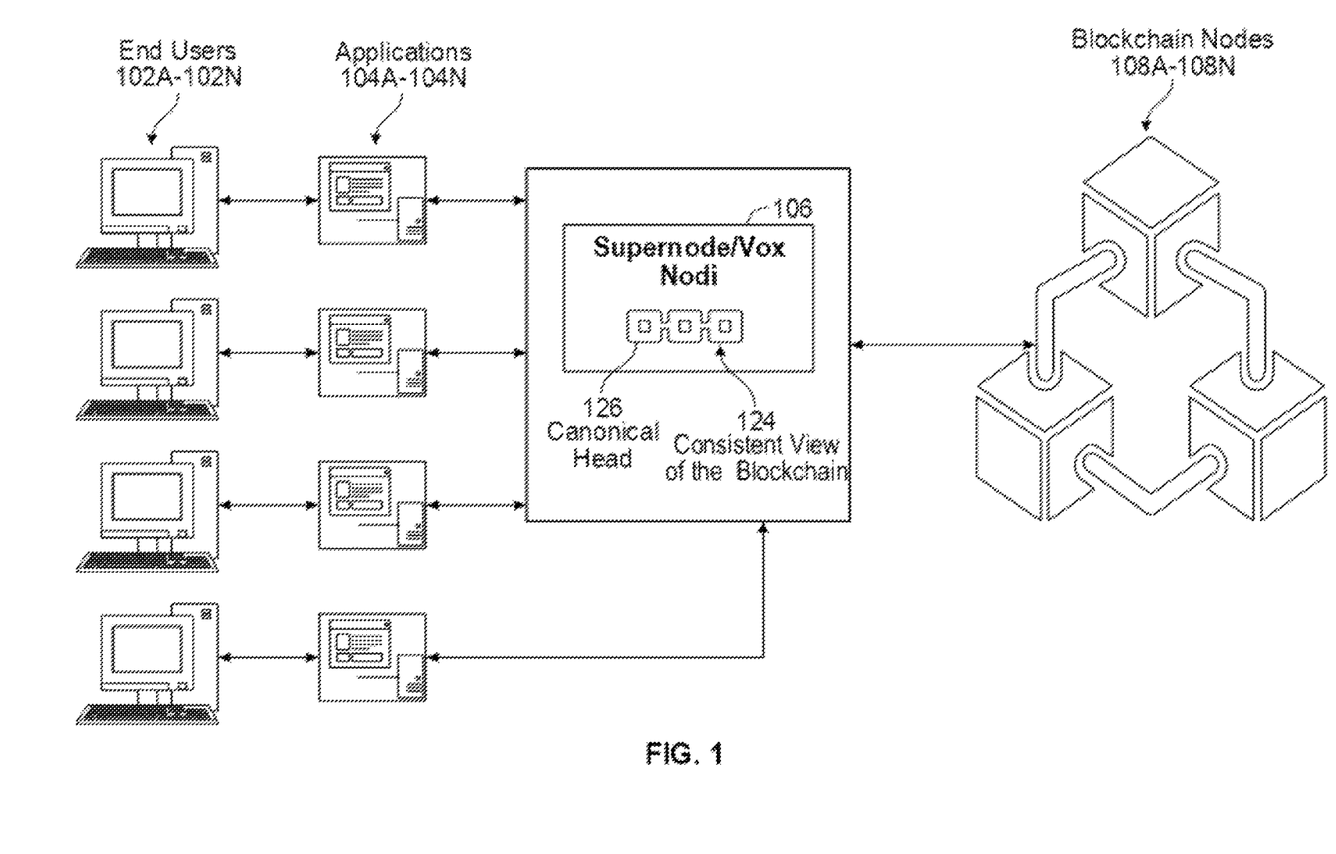
FIG. 1 is an example environment where aspects of the present disclosure can be implemented for use.

Referring now to FIG. 1, which illustrates an example architecture where aspects of the present disclosure are implemented. The architecture comprises a plurality of end user systems 102A-102N, a plurality of decentralized applications 104A-104N, a supernode 106, and a plurality of blockchain nodes 108A-108N.

In general, the supernode 106 is an explicit consistency layer that helps to ensure that any blockchain request being served will return a consistent result. The supernode works by running a consensus algorithm across a network of blockchain nodes, where each piece of the infrastructure can vote on the correct state of the blockchain.

By correctly routing and adjusting queries, the supernode ensures that despite various nodes having different views of transaction data at any given time, the results are consistently accurate. This guarantees that any request to the supernode is returned quickly, reliably, and with consistent data. The supernode enables developers to scale infinitely and reliably, because rather than an individual node, there is a broader set of nodes that are queried in order to respond to each request.

While not illustrated, the blockchain nodes 108A-108N may also be further subdivided into units called shards. The elements of the architecture can communicatively couple with one another over a network or a plurality of networks, as would be known to one of ordinary skill in the art with the present disclosure before them. For example, the network may include any one or a combination of multiple different types of networks, such as cable networks, the Internet, wireless networks, and other private and/or public networks. In some instances, the network may include cellular, Wi-Fi, or Wi-Fi direct. Any suitable network may be used herein.

The end user systems 102A-102N can include any suitable computing device for any user that desires to obtain blockchain data. While the example architecture illustrates access to the blockchain data through one or more decentralized applications, the end user systems 102A-102N may also be allowed to request blockchain data directly from the supernode 106, if desired. That is, the supernode architecture can include an application development environment that can be used to create and access applications by an end user computing device.

A decentralized application can include any application which talks to a blockchain network. These applications can be used to read/write blockchain data, create/access/transfer NFTs, or any other desired service related to blockchain data. In general, the decentralized applications 104A-104N receive requests from the end user systems 102A-102N and receive responses from the supernode 106. The supernode 106 can request the blockchain data to serve the request from the blockchain nodes 108A-108N.

Figure 2A:
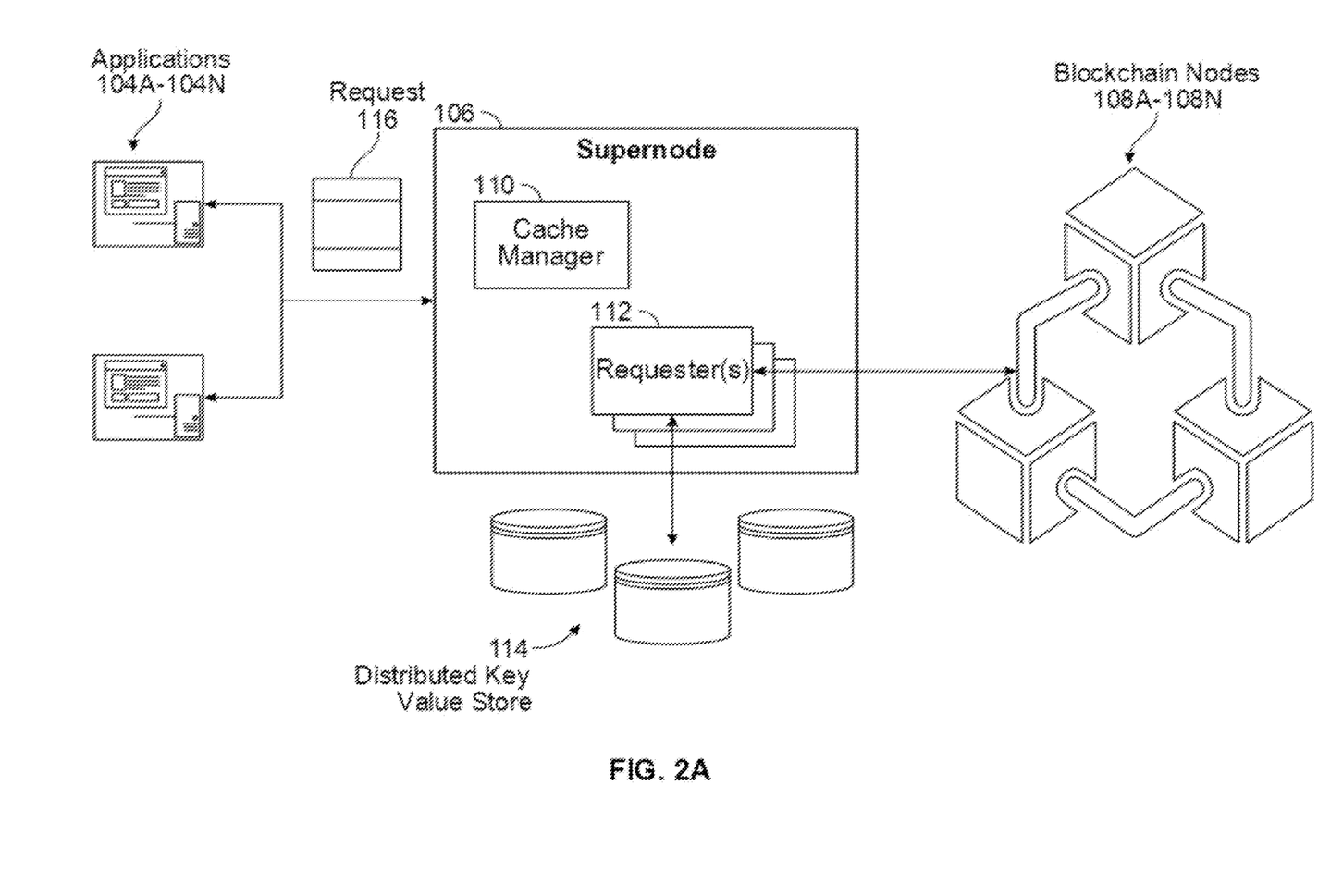
FIGS. 2A and 2B collectively illustrate an example system that includes an optimized cache, as well as a process for creating cache entries.
Figure 2B:
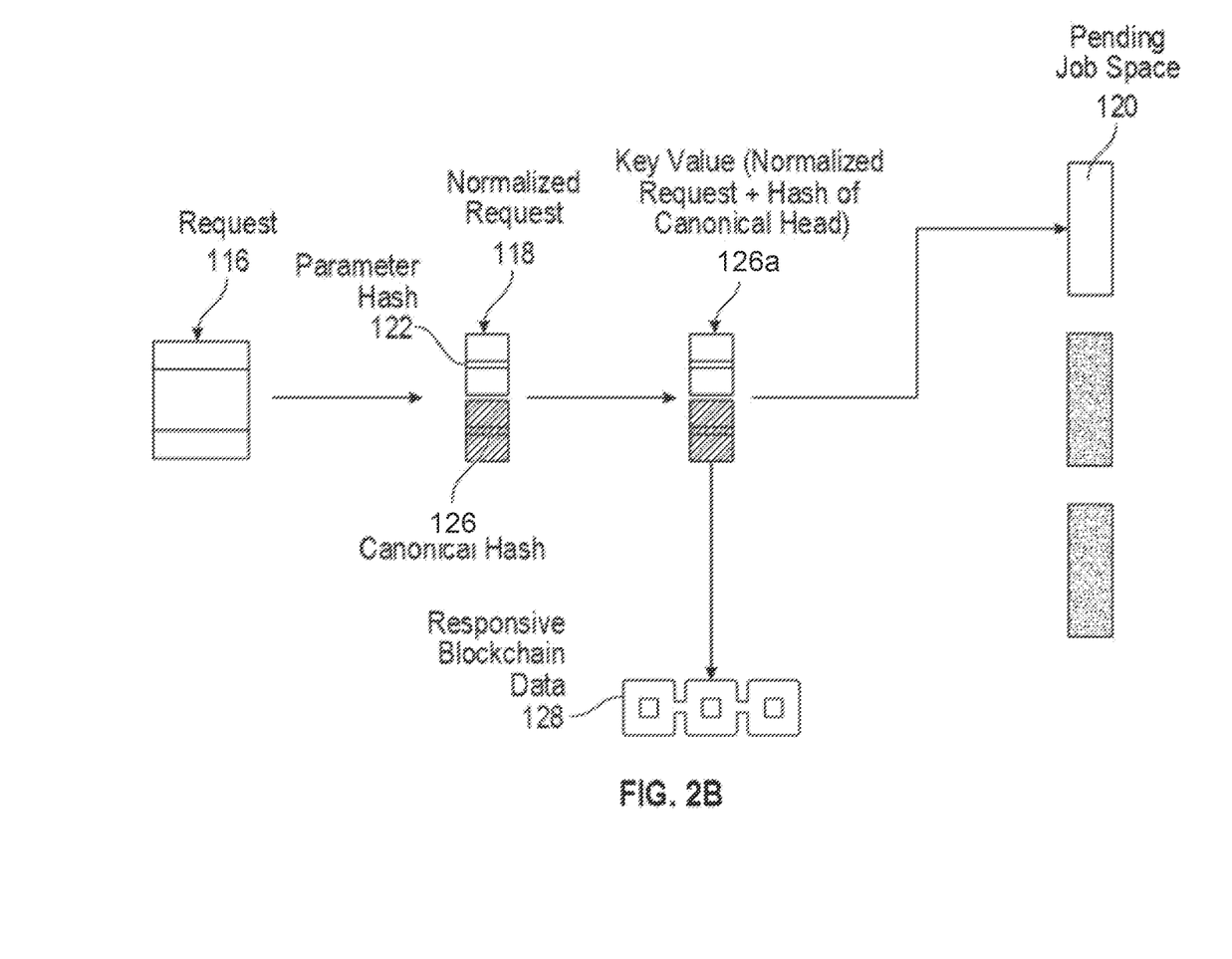

Referring now to FIGS. 2A and 2B collectively, the supernode 106 can include a cache manager 110, requester(s) 112, and an optimized cache in the form of a distributed key value store 114. It will be understood that this is a partial view of the many features of the supernode 106 that have been omitted from this description so as not to obscure the description of the features disclosed herein.

The supernode 106 can receive a request 116 for blockchain data from the decentralized applications 104A-104N and deploy agents (or other similar constructs) such as the cache manager 110 and requester(s) 112 to process requests for blockchain data. The cache manager 110 can be used to orchestrate the use of the distributed key value store 114 to prevent deleterious use of the distributed key value store 114, such as unnecessary overwrites, and other issues.

In some embodiments, each of the decentralized applications 104A-104N can be configured to perform a request processing such as request normalization, as well as other methods related to how values are searched, generated, and/or stored in the distributed key value store 114. For clarity, the description herein will refer to these features being performed by the cache manager 110 or requester(s) 112, but it will be understood that these functions can be performed by the decentralized applications 104A-104N as well.

In general, when a request is received, the requester 112 can normalize the request. For example, a requester 112 can first remove unwanted data from the request, such as a request identifier. A method of the request and parameters of the request are then identified. The method can be used to traverse a tree structure (or other logical construct) of the parameters to find salient parameters. For each API method that is supported by the cache methods disclosed herein, there is an associated API specification that defines the salient parameters. These can be data obtained from the Ethereum specification or can include any custom parameter. Once these salient parameters are found, the relevant data for the request can be hashed into key, referred to as a normalized request 118. Some parameters are written in JSON format, which is order-independent and white-space agnostic. Thus, in some instances, the hashing algorithm used to process the request is one that accommodates order-independent and white-space agnostic data.

According to some embodiments, when parameters are large, a parameter can be separated into segments. For example, a first portion of the parameter can be hashed with a type of hashing algorithm. An example of the first algorithm could be a string code algorithm in the Java standard such as $s[9]*31^{\wedge}(n-1)+s[1]*31^{\wedge}(n-2)+ \ldots +s[n-1]$. A second, slower, less accurate hashing algorithm such as Murmur128 can be used to create a second hash of a remainder of the parameter. The Murmur128 algorithm can be used to hash the first hash value with the second hash value. Once all the parameters have been hashed, these individual hash values can be processed using a hashing algorithm to arrive at an interim key. It will be understood that while certain hashing algorithms have been described, other hashing algorithms that would be known to one of ordinary skill in the art can be used.

In some embodiments, the hash of the request is coupled with a hash of a canonical head block obtained from a consensus vote from the blockchain nodes 108A-108N (referred to as attestors). The canonical head can be hashed independently and then combined with the interim key to create a final key. The canonical head is a latest block to be proposed on a blockchain. New canonical heads can be added according to a predetermined schedule governed by slots and epochs, the scope of which are beyond this disclosure, but can be found in co-pending application U.S. Ser. No. 18/083,421, filed on Dec. 16, 2022, which is hereby incorporated by reference herein in its entirety. The tying of the canonical head in the key ensures that if a fork or other error in the blockchain occurs, which would result in a new canonical head, the key-value pairs can then be recreated. In sum, the cache manager 110 can determine a change to the canonical head (which could be identified by the blockchain nodes). When this occurs, the cache manager 110 can assign subsequent requests to a separate space in the cache to prevent invalid values from being returned for subsequent requests that are generated after the change to the canonical head.

In addition to writing key value pairs into the distributed key value store 114, various types of contextual information can be included along with the value such as a timestamp or other desired data. It will be understood that the key and value are associated with data on the blockchain and stored in the distributed key value store 114. Thus, the data pertaining to the request can be obtained using the key. The distributed key value store 114 can manage the pairs (e.g., key, value/blockchain data), which can be used to obtain the desired blockchain data. In general, the key can indicate a location of the stored data and can be used to retrieve stored data that has been previously requested.

When a subsequent requester receives a second, identical request, the subsequent requester normalizes the second request into a new key using the process outlined above. This subsequent key is searched across the distributed key value store 114. Because the requesters are using the same normalization process, the keys generated by each will be an exact match or a mismatch.

In this example, the new key is identical to the prior key that was already stored by another prior requester. Thus, the request can be served with a response that includes the blockchain data associated with the key value pair. This process deduplicates the second request and thus serves the matching key value responses directly from the distributed key value store 114, without having to regenerate the same response.

When a key is searched against the distributed key value store 114 and a match is not found, a job process can be initiated. This can include creating a pending job space 120 in the distributed key value store 114. The pending job space 120 includes an indication that a response is in the process of being generated, such as a globally unique identifier (GUID). The pending job space 120 can be assigned a job identifier, a time stamp, and other pertinent data such as an attempt counter. The attempt counter indicates how many times any or all requester(s) has attempted to generate a response without success. The time stamp allows for a subsequent requester to determine an age of the job.

The second or subsequent requester (note that many other nodes may be waiting on this job to complete) has various options. For example, the subsequent requester can wait for the response to be generated by the first requester. In one embodiment, when the subsequent requester encounters the pending job space 120, the subsequent requester can enter a sleep cycle and then attempt to obtain the response at a later time. In some embodiments, the subsequent requester may wait a predetermined period of time or await a predetermined number of attempts before generating a response on its own. If the subsequent requester is successful and generates a response it can put its value into the pending job space 120. If the original requester obtains a successful result before the subsequent requester, the original requester can place its value into the pending job space 120. In some embodiments, the subsequent requester may be configured to wait a longer period of time when the attempt counter has a high number. However, if the conditions for allowing the subsequent requester to generate a response exist, the subsequent requester can put a new key value pair in a new job space.

As noted above, the salient parameters are hashed into a parameter hash 122, the canonical head is hashed into a canonical hash 126. The combination of these two resultant hashes can be again hashed to create a new key. In some embodiments, the parameter hash 122 can be concatenated with the canonical hash 126, but these values are not hashed a third time, but stored directly as a key value pair.

Once a key value pair 126a has been written into the pending job space 120, the key value pair 126a can be used to serve future requests for the same blockchain data. As noted above, the key value pair 126a is linked logically to responsive blockchain data 128. The responsive blockchain data is obtained from a consistent view of the blockchain 124 as noted above.

Once a value has been written, there are some conditions under which additional values can be written. Because the normalized request hash has been concatenated with the canonical head hash to form the key-space for the request, there is no need to overwrite/rewrite results. Requests on a new head will generate a different value and thus won't collide with existing results.

For example, the supernode 106 can create a new key value in the distributed key value store 114 upon the occurrence of various events, such as when a new canonical head is selected, when a fork occurs at the blockchain, the uncling of a block, the reorganization of the blockchain, or any other event that produces a fundamental change to the blockchain. Again, the key value pair that is stored is a combination of not only the request, but also a hash of the canonical head.

In some embodiments, requesters may be served error messages when no response is found within a specified period of time or after a certain number of attempts. In one embodiment, a requester can wait until a soft threshold is hit. For example, the requester may have had to wait too long or for too many cycles for a response. A soft threshold for either time or attempts may be observed to reduce the likelihood that the requester will receive an error message. Thus, the time and/or attempts may be increased to ensure that transient errors are not reported. That is, the extra time/cycles afforded by the soft threshold provide extra opportunities for the response to be generated rather than serving an error response. In some embodiments, a hard threshold can be used as well. The hard threshold can be either or both of a time and/or attempt value. It will be understood that the hard threshold has a higher value than the soft threshold. When this hard threshold is hit, the requester can return an error code. That is, the hard threshold is either a maximum number of attempts or wait time, after which an error message is returned. Regardless of how it was generated, if the conditions are met for generating an error message, that code is then written into the pending job space 120. In some instances, the error message is a time-out error. To be sure, if other requests for data are received, requesters can attempt to generate responses that would replace the error code stored in the pending job space 120. If errors for the same requests from multiple requests fail then the supernode may identify these errors as final and identify these errors uniquely.

Another issue may arise when a request is received numerous times. These types of requests are referred to as hot keys. A chilling mechanism can be used to ensure that a particular shard of the cache is not overrun with requests.

In general, blocks can be added to a blockchain according to slots and epochs. A slot is an opportunity for a block to be added to the chain. In some instances, slots occur approximately every twelve seconds. An epoch is thirty-two slots, which occurs approximately every six minutes for certain blockchains.

In essence, this chilling process involves creating copies of the hot key and distributing those replicas to other shards. A key chiller in-memory process can track a mapping of a key count to a key value to determine how many times that particular key has been used to generate values (e.g., how many times is the exact same data being requested). The raw count of key generations can be divided by a chilling factor. The chilling factor can be determined such that after a predetermined number of generations of the same key (a key has been generated ten times, as an example), the key chiller will increment a key count by one. The key chiller can randomly pick a value between one and the number of times the key has been generated and divide this value by the chilling factor. The keys can be assigned an identifier based on the chilling factor and then assigned to different shards.

In addition, there are methods to improve the accuracy and reliability of the distributed key value store 114. One example process is referred to as parity testing. In some instances, for each method the optimized cache supports, a percentage of requests can be examined and compared to duplicates of those requests that are run at the node level. In sum, the responses received from polling the distributed key value store 114 should match the results obtained from querying the nodes directly. When discrepancies exist, the distributed key value store 114 may be out of date. Thus, there may be permission granted to allow requesters to begin updating the values of the distributed key value store 114.

As noted, when a method has been identified from a request, the percentage for parity testing may initially be high, such as 30-40% of all similar requests for the method type. As responses are received and parity checked and determined to be accurate, this percentage may be automatically adjusted over time to a nadir percentage, such as five percent. Again, parity testing may help identify issues on the blockchain such as reorganizations of the blockchain, block uncling, forks, and so forth.

The distributed key value store 114 can also implement a synchronization method that can be used to prevent unwanted overwrites of pending job spaces. A synchronization method can be implemented using various components, which include a value or job identifier, a success value or failure value, and a job status. In one example, a first requester starts a job. Before the response is generated and the key value pair is added to the pending job space, a second requester attempts to fill the same slot. In this example, it is possible that both requesters started their process at the same time, or approximately the same time. The second requester was able to create a job and placed the pending job identifier in the slot before the first requester. The synchronization algorithm involves two methods on the key/value store that work atomically: an example call could include "set value if no value exists" (SETX) and "get value currently in slot and set provided value into slot" (GETSET).

Thus, the first requester will see the pending job and enter a waiting cycle for the response as described above. The requesters can also see that a success value or a failure value has been written into the distributed key value store 114. In order to prevent overwrites, the success value could be written into one location in the distributed key value store 114 and the failure value into another location in the distributed key value store 114. The distributed key value store 114 does not overwrite success values with 'pending job' values, and instead pending job values are assigned their own slot.

When a job is running but the time threshold for waiting has elapsed, the job identifier provides information on how old the job is and whether it is active or is another job written by another requester. For example, if a requester generates a response and wants to write the key value pair into the pending job space, the requester can check the job identifier first before writing the key value pair. If the job identifier is the same as the one the requester wrote in, the requester can put in their key value pair. If the job identifier is different, the requester can go into a wait cycle. The requester can only write its key value pair in if the other job fails for any of the various reasons disclosed herein.

Figure 3:
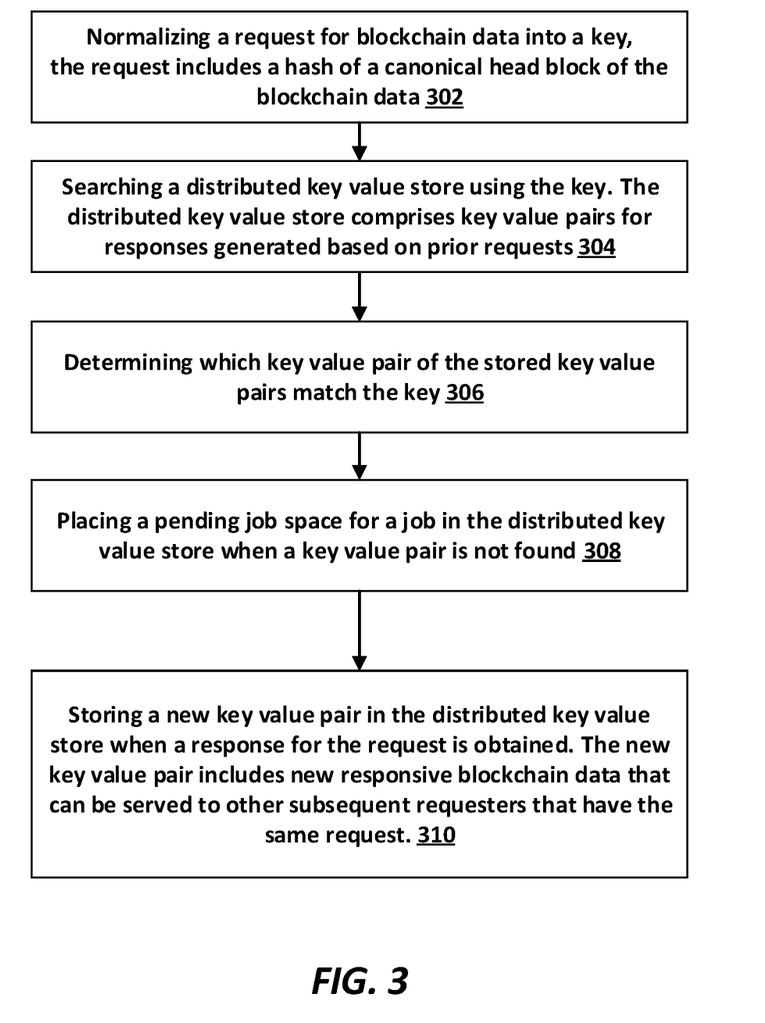
FIG. 3 is a flowchart of an example method of the present disclosure for creating and using an optimized cache.

FIG. 3 is a flowchart of an example method of the present disclosure. The method can include a step 302 of normalizing a request for blockchain data into a key. As noted above, the request includes a hash of a canonical head block of the blockchain data. Next, the method includes a step 304 of searching a distributed key value store using the key. The distributed key value store comprises key value pairs for responses generated based on prior requests. In some embodiments, each of the stored key value pairs are associated with responsive blockchain data. For example, a logical mapping between a key value pair exists and can be served to other subsequent requesters.

The method can also include a step 306 of determining which key value pair of the stored key value pairs match the key. When this occurs, the value of the key value pair can be served, which deduplicates the request, thereby preventing the response from having to be generated more than once.

However, when a match is not found, the method can include a step 308 of placing a pending job space for a job in the distributed key value store when a key value pair is not found. This process is the initiation of a response gathering process by a requester. When a response has been found, the method includes a step 310 of storing a new key value pair in the distributed key value store when a response for the request is obtained. The new key value pair includes new responsive blockchain data that can be served to other subsequent requesters that have the same request.

Figure 4:
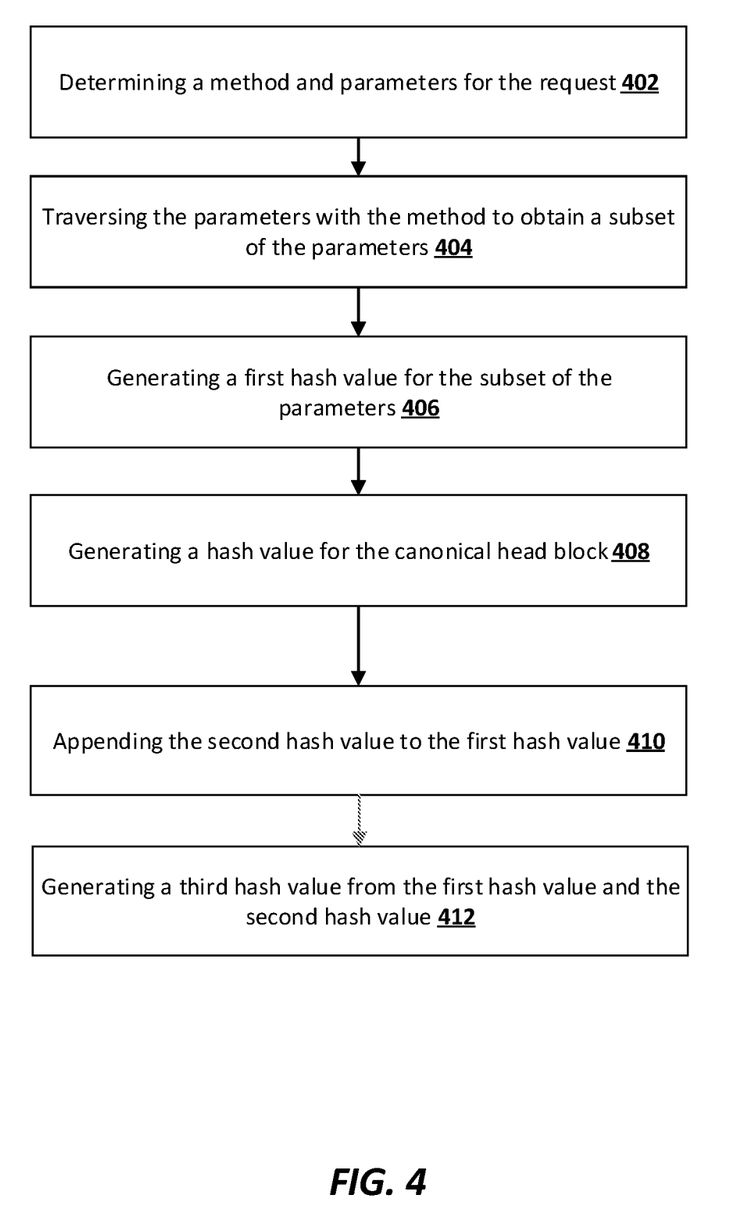
FIG. 4 is a flowchart of an example method for normalizing a request.

FIG. 4 is a flowchart of an example method for normalizing a request. The method can include a step 402 of determining a method and parameters for the request. That is, the request can be examined for both a method and parameters. In some instances, unwanted request data can be removed, such as a request identifier or other ancillary data. Next, the method includes a step 404 of traversing the parameters with the method to obtain a subset of the parameters. These parameters are referred to generally as "salient" parameters. The method can also include a step 406 of generating a first hash value for the subset of the parameters.

In some embodiments, the method can include a step 408 of generating a hash value for the canonical head block. This canonical head block is used to ensure consistency in response generation. That is, when the canonical head block changes, the responses generated using an old canonical head block are considered to be old. A requester can determine the hash of the canonical head block in a key value stored in the distributed key value store to see how fresh the response is.

In some embodiments, the method includes a step 410 of appending the second hash value to the first hash value. Next, the method includes a step 412 of generating a third hash value from the first hash value and the second hash value. Again, this can be used to create the normalized request. Thus, the hash of the salient parameters and the hash of the canonical head are hashed.

Figure 5:
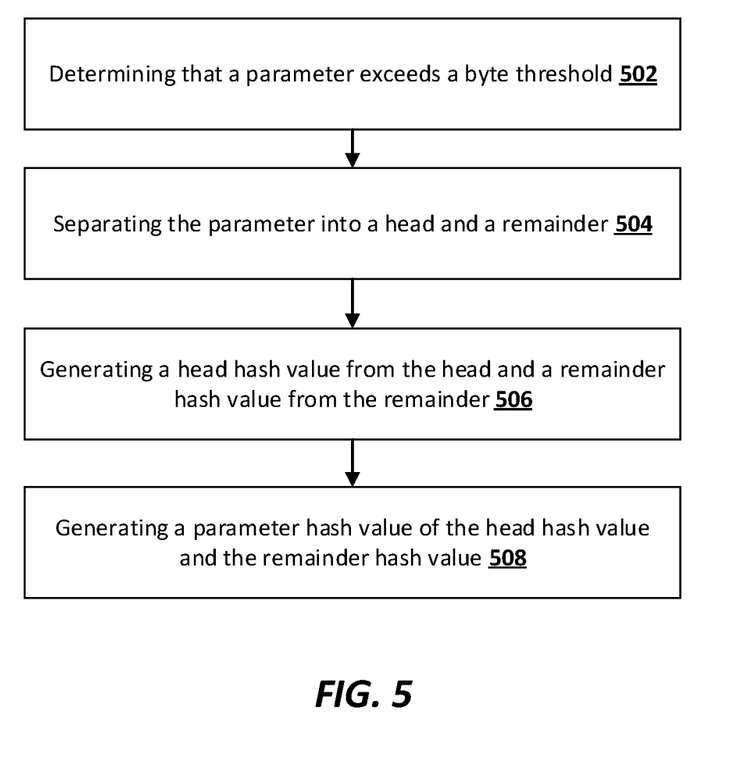
FIG. 5 is a flowchart of a method for identifying and processing a large parameter found in a request.

Referring now to FIG. 5, which illustrates a method for identifying and processing a large parameter found in a request. To be sure, some parameters in a request for blockchain data may be voluminous in size, so a process may be used to shrink voluminous parameters. This method can be used to shrink parameters as a part of the key value generation process.

The method can include a step 502 of determining that a parameter exceeds a byte threshold. Once a parameter is determined to be too large, the method includes a step 504 of separating the parameter into a head and a remainder. The method includes a step 506 of generating a head hash value from the head and a remainder hash value from the remainder, as well as a step 508 of generating a parameter hash value of the head hash value and the remainder hash value.

In some embodiments, the head hash value is generated using a first hashing algorithm, and the remainder hash value is generated using a second hashing algorithm. The second hashing algorithm is a slower hashing algorithm than the first hashing algorithm.

Figure 6:
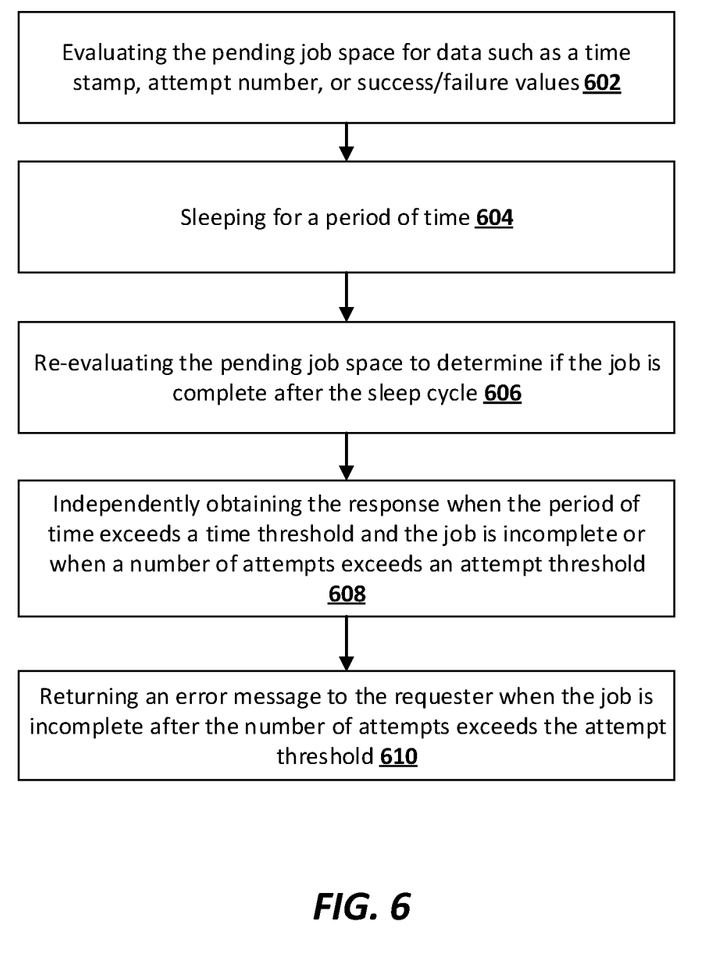
FIG. 6 is a flowchart of an example method related to how a subsequent requestor can wait for a response or generate a response when thresholds are exceeded.

FIG. 6 is a flowchart of an example method related to how a subsequent requestor can wait for a response or generate a response when thresholds are exceeded. The method can include a step 602 of evaluating the pending job space for data such as a time stamp, attempt number, or success/failure values. If appropriate, the method can include a step 604 of the requester sleeping for a period of time, as well as step 606 of re-evaluating the pending job space to determine if the job is complete after the sleep cycle.

The method can include a step 608 of independently obtaining the response when the period of time exceeds a time threshold and the job is incomplete or when a number of attempts exceeds an attempt threshold. In some embodiments, the method can include a step 610 of returning an error message to the requester when the job is incomplete after the number of attempts exceeds the attempt threshold.

Figure 7:
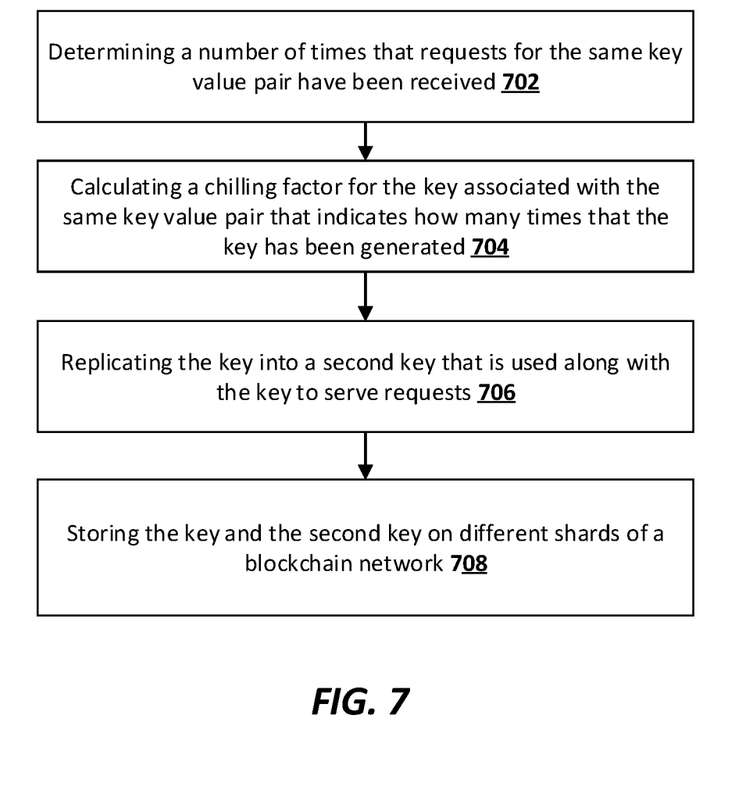
FIG. 7 is a flowchart of an example method for chilling a hot key.

FIG. 7 is a flowchart of an example method for chilling a hot key. The method can include a step 702 of determining a number of times that requests for the same key value pair have been received, as well as a step 704 of calculating a chilling factor for the key associated with the same key value pair that indicates how many times that the key has been generated. In some embodiments, the method includes a step 706 of replicating the key into a second key that is used along with the key to serve requests. In some embodiments, the method includes a step 708 of storing the key and the second key on different shards of a blockchain network.

Figure 8:
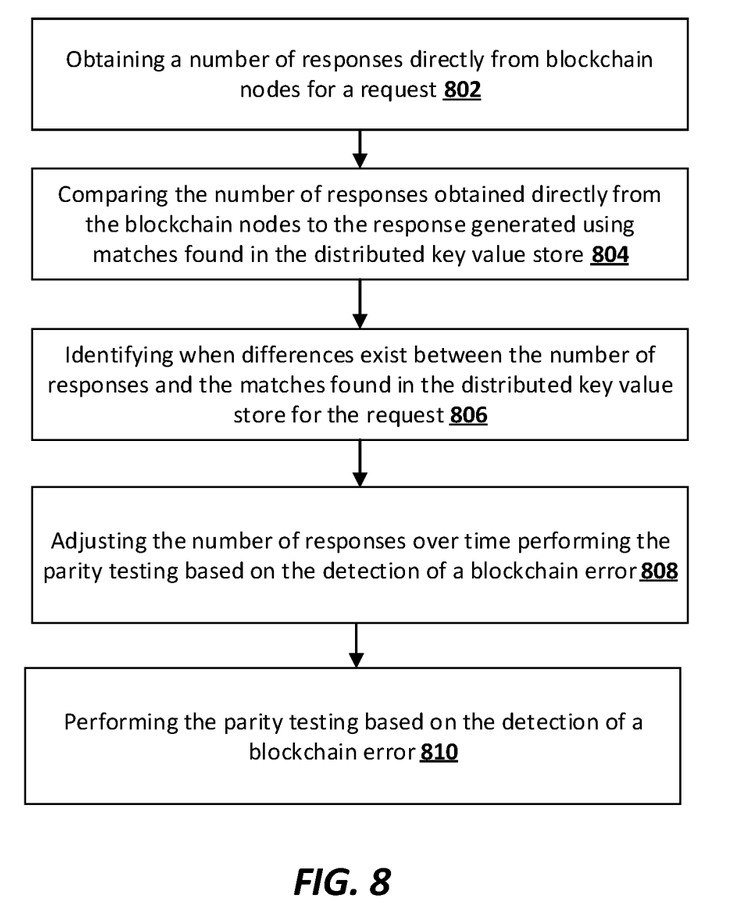
FIG. 8 is a flowchart of an example method for parity testing.

FIG. 8 illustrates an example method for parity testing an optimized cache. The method can include a step 802 obtaining a number of responses directly from blockchain nodes for a request. This can be done on a per-method basis for each type of method stored in the optimized cache. The method can include a step 804 of comparing the number of responses obtained directly from the blockchain nodes to the response generated using matches found in the distributed key value store. In step 806, the method includes identifying when differences exist between the number of responses and the matches found in the distributed key value store for the request. The method can also include a step 808 of adjusting the number of responses over time, as well as a step 810 of performing the parity testing based on the detection of a blockchain error.

Figure 9:
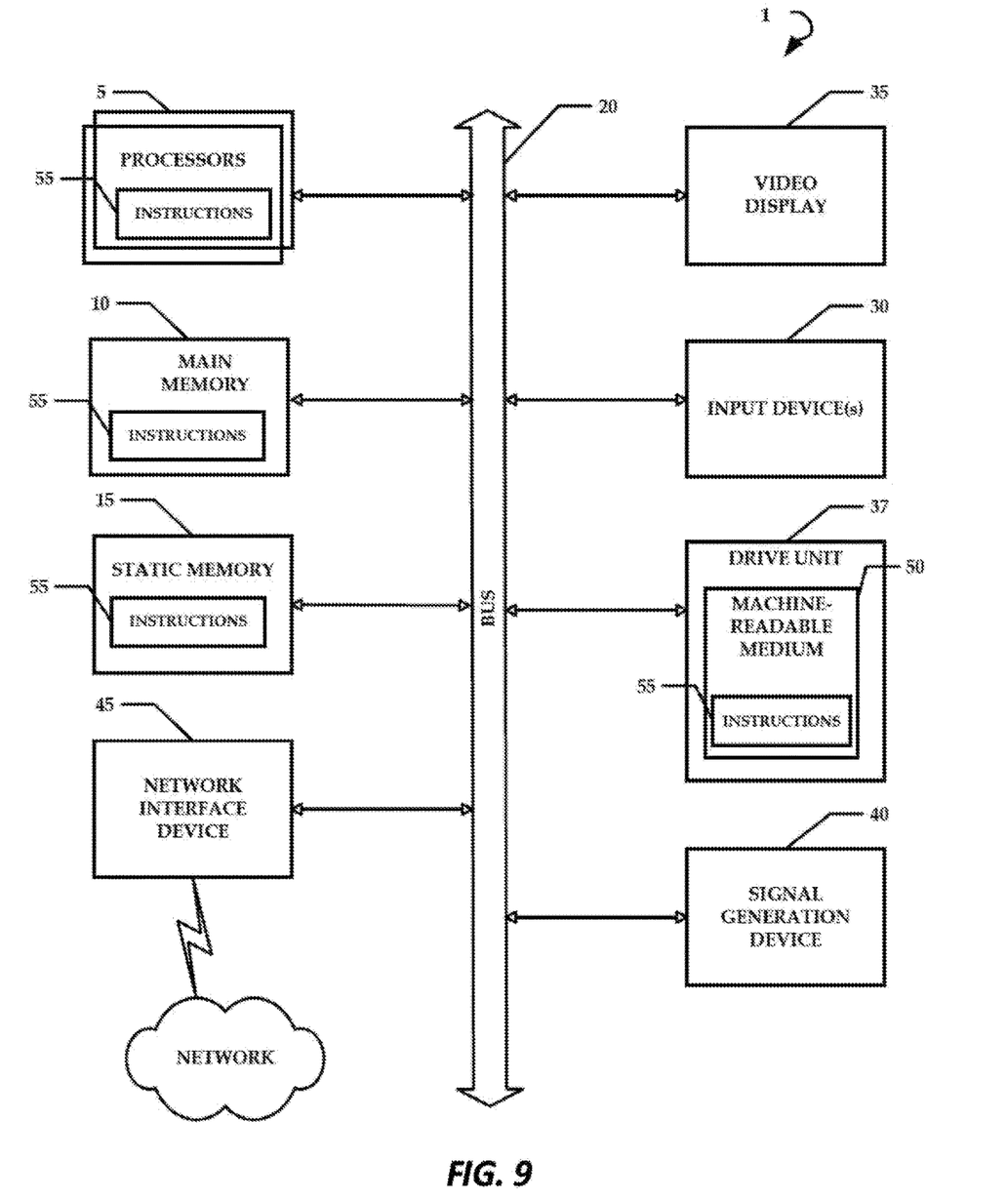
FIG. 9 is a simplified block diagram of a computing system, in accordance with some embodiments.

FIG. 9 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or decentralized) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or decentralized database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "$N+1$") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The invention claimed is:

1. A method comprising:
   normalizing a request for blockchain data into a key, the request including a hash of a canonical head block of the blockchain data;
   searching a distributed key value store using the key, the distributed key value store comprising key value pairs, each of the key value pairs being associated with responsive blockchain data;
   determining when one of the key value pairs matches the key;
   placing a pending job space for a job in the distributed key value store when a match is not found; and
   storing a new key value pair in the distributed key value store when a response for the request is obtained, the response comprising new responsive blockchain data, the new key value pair comprising the key.

2. The method according to claim 1, wherein the normalizing includes:
   determining a method and parameters for the request;
   traversing the parameters with the method to obtain a subset of the parameters; and
   generating a first hash value for the subset of the parameters.

3. The method according to claim 2, further comprising:
   generating a second hash value for the canonical head block;
   appending the second hash value to the first hash value; and
   generating a third hash value from the first hash value and the second hash value.

4. The method according to claim 3, further comprising:
   determining that a parameter exceeds a byte threshold;
   separating the parameter into a head and a remainder;
   generating a head hash value from the head and a remainder hash value from the remainder; and
   generating a parameter hash value of the head hash value and the remainder hash value.

5. The method according to claim 4, wherein the head hash value is generated using a first hashing algorithm and the remainder hash value is generated using a second hashing algorithm, the second hashing algorithm being a slower hashing algorithm than the first hashing algorithm.

6. The method according to claim 1, further comprising:
   determining a change to the canonical head block; and
   allowing creation of new key value pairs in the distributed key value store as responses to requests are generated after the change to the canonical head block.

7. The method according to claim 1, further comprising writing to the pending job space a job identifier and a timestamp for when the pending job space was created.

8. The method according to claim 7, wherein another key value pair is written to the pending job space when the response is obtained.

9. The method according to claim 1, further comprising incrementing an attempt number each time a requester has attempted to run a same job.

10. The method according to claim 1, further comprising creating a new pending job space by a second requester that includes another key when the second requester has obtained another key value pair before a first requester has determined the new key value pair.

11. The method according to claim 10, further comprising obtaining the new responsive blockchain data associated with the another key value pair or the new key value pair.

12. The method according to claim 1, further comprising:
    evaluating the pending job space;
    sleeping for a period of time; and
    re-evaluating the pending job space to determine if the job is complete.

13. The method according to claim 12, further comprising independently obtaining the response when the period of time exceeds a time threshold and the job is incomplete or when a number of attempts exceeds an attempt threshold.

14. The method according to claim 13, further comprising returning an error message to a requester when the job is incomplete after the number of attempts exceeds the attempt threshold.

15. The method according to claim 1, further comprising:
    determining a number of times that requests have been received that correspond to a same key of a same key value pair;
    calculating a chilling factor for the same key that indicates how many times that the same key has been generated; and
    replicating the same key into a second key that is used along with the same key to serve requests.

16. The method according to claim 15, further comprising storing the same key and the second key on different shards of a blockchain network.

17. The method according to claim 1, further comprising synchronizing the distributed key value store by generating a job status identifier, the job status identifier comprising either a success indication or a failure indication, wherein the success indication is written into a first location in the distributed key value store and the failure indication is written into a second location in the distributed key value store.

18. The method according to claim 1, further comprising parity testing the distributed key value store by:
    obtaining a number of responses directly from blockchain nodes for a request;
    comparing the number of responses obtained from the blockchain nodes to the response generated using matches found in the distributed key value store; and
    identifying when differences exist between the number of responses and the matches found in the distributed key value store for the request.

19. The method according to claim 18, further comprising adjusting the number of responses over time.

20. The method according to claim 19, further comprising performing the parity testing based on detection of a blockchain error.

21. A system comprising:
    a processor; and
    a memory coupled to the processor, the memory for storing instructions, the processor executing the instructions which cause the processor to perform operations comprising:
       normalizing a request for blockchain data into a key, the request including a hash of a canonical head block of the blockchain data;
       searching a distributed key value store using the key, the distributed key value store comprising key value pairs, each of the key value pairs being associated with responsive blockchain data;

determining when one of the key value pairs matches the key;

placing a pending job space for a job in the distributed key value store when a match is not found; and storing a new key value pair in the distributed key value store when a response for the request is obtained, the response comprising new responsive blockchain data, the new key value pair comprising the key.

22. The system according to claim 21, wherein the processor is configured to:

determine a method and parameters for the request;

traverse the parameters with the method to obtain a subset of the parameters; and generate a first hash value for the subset of the parameters.

23. The system according to claim 22, wherein the processor is configured to:

generate a second hash value for the canonical head block;

append the second hash value to the first hash value;

generate a third hash value from the first hash value and the second hash value;

determine that a parameter exceeds a byte threshold;

separate the parameter into a head and a remainder;

generate a head hash value from the head and a remainder hash value from the remainder; and generate a parameter hash value of the head hash value and the remainder hash value, wherein the head hash value is generated using a first hashing algorithm and the remainder hash value is generated using a second hashing algorithm, the second hashing algorithm being a slower hashing algorithm than the first hashing algorithm.

24. The system according to claim 21, wherein the processor is configured to:

determine a change to the canonical head block; and allow creation of new key value pairs in the distributed key value store as responses to requests are generated after the change to the canonical head block.

25. The system according to claim 21, wherein the processor is configured to:

write to the pending job space a job identifier and a timestamp for when the pending job space was created, wherein a key value pair is written to the pending job space when the response is obtained.

26. The system according to claim 21, wherein the processor is configured to:

increment an attempt number each time a requester has attempted to run a same job;

create a new pending job space by a second requester that receives another key value pair when the second requester has obtained the another key value pair before a first requester has obtained the new key value pair; and obtain the new responsive blockchain data associated with the another key value pair or the new key value pair.

27. The system according to claim 21, wherein the processor is configured to:

evaluate the pending job space;

sleep for a period of time;

re-evaluate the pending job space to determine if the job is complete;

independently obtain the response when the period of time exceeds a time threshold and the job is incomplete or when a number of attempts exceeds an attempt threshold; and return an error message to a requester when the job is incomplete after the number of attempts exceeds the attempt threshold.

28. The system according to claim 21, wherein the processor is configured to:

determine a number of times that requests for a same key for a same key value pair has been received;

calculate a chilling factor that indicates how many times that the same key has been generated;

replicate the same key into a second key that is used along with the same key to serve requests; and store the same key and the second key on different shards of a blockchain network.

29. The system according to claim 21, wherein the processor is configured to synchronize the distributed key value store by generating a job status identifier, the job status identifier comprising either a success indication or a failure indication, wherein the success indication is written into a first location in the distributed key value store and the failure indication is written into a second location in the distributed key value store.

30. The system according to claim 21, wherein the processor is configured to:

obtain a number of responses directly from blockchain nodes for a request;

compare the number of responses obtained from the blockchain nodes to the response generated using matches found in the distributed key value store; and identify when differences exist between the number of responses and the matches found in the distributed key value store for the request.

* * * * *